United States Patent [19]

Perry

[11] Patent Number: 4,845,818

[45] Date of Patent: Jul. 11, 1989

[54] DEVICE FOR CHANGING FUEL PUMP ON INTERNAL COMBUSTION ENGINE

[76] Inventor: Oliver L. Perry, P.O. Box 1632, High River, Alberta, Canada, T0L 1B0

[21] Appl. No.: 144,273

[22] Filed: Jan. 15, 1988

Related U.S. Application Data

[63] Continuation-in-part of Ser. No. 886,173, Jul. 16, 1986, Pat. No. 4,720,900.

[51] Int. Cl.⁴ .............................................. B23P 19/00
[52] U.S. Cl. ................................... 29/156.4 R; 269/49; 269/53; 269/54.4; 411/309; 411/386
[58] Field of Search ............... 411/386, 393, 309, 310, 411/311, 411, 2, 3, 4, 5, 6, 9, 408, 413; 269/53, 54.4, 49; 29/156.4 R

[56] References Cited

U.S. PATENT DOCUMENTS

| | | | |
|---|---|---|---|
| 1,980,093 | 11/1934 | Rosenberg | 411/412 |
| 3,248,747 | 5/1966 | Scott | 411/411 |
| 3,935,785 | 2/1976 | Lathom | 411/413 |
| 4,027,573 | 6/1977 | Laverty | 411/413 |

FOREIGN PATENT DOCUMENTS

| | | | |
|---|---|---|---|
| 874160 | 4/1942 | France | 411/411 |
| 2557286 | 8/1986 | France | 411/327 |
| 482315 | 3/1938 | United Kingdom | 411/386 |

OTHER PUBLICATIONS

Setko Set Screws Catalog No. 19, p. 2.

Primary Examiner—P. W. Echols
Assistant Examiner—Kevin Jordan
Attorney, Agent, or Firm—Brady, O'Boyle & Gates

[57] ABSTRACT

A specially designed holding device for holding a fuel pump push rod in place during the installation of a fuel pump on an internal combustion engine is threaded into an existing threaded bore which intersects the passage containing the push rod. The holding device comprises an elongated threaded member of relatively soft metallic material compared to that of the block, e.g. aluminum, and having safety means for preventing damage to the push rod comprising an undersized forward inner thread portion, i.e. the first 2½ to 3 threads, which will strip more readily than the threads of the engine block in the bore when over tightened. Alternatively, the safety means comprises a relatively soft metallic inner end portion or tip on the holding device.

10 Claims, 3 Drawing Sheets

FIG.6
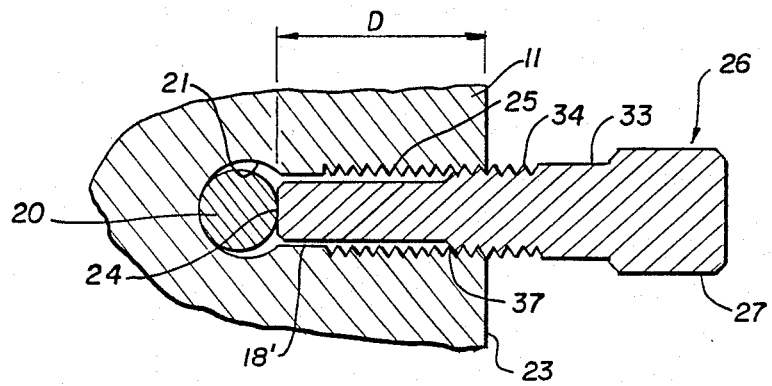
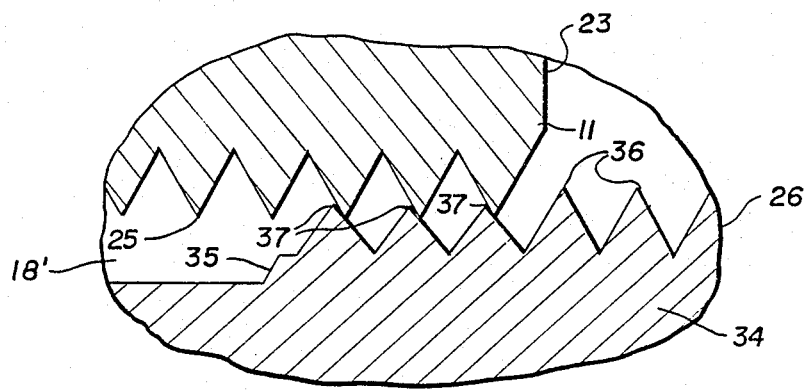
FIG.7

1

DEVICE FOR CHANGING FUEL PUMP ON INTERNAL COMBUSTION ENGINE

CROSS REFERENCE TO RELATED APPLICATION

This is a continuation-in-part application of prior copending application U.S. Ser. No. 06/886,173 entitled, "Method of Installing A Fuel Pump, filed July 16, 1986, filed U.S. Pat. No. 4,720,900.

BACKGROUND OF THE INVENTION

2. Technical Field

The present invention relates to a device which facilitates replacing the fuel pump on V-8 gasoline engines manufactured by General Motors Corporation, and more particularly relates to a device and method for holding up the fuel pump push rod connected with the engine cam shaft while a fuel pump is being installed to assure proper operating engagement of the push rod with the fuel pump arm.

2. The Prior Art:

In the prior art, mechanics required to replace fuel pumps on General Motors V-8 gasoline engines manufactured from 1955 to the present time have resorted to haphazard and somewhat inconvenient means for holding the fuel pump push rod elevated while the new fuel pump is being installed on the engine. These haphazard means range from screwdrivers to bent table knives, hacksaw blades, bent feeler gages, and strips of metal. These devices are inserted between the engine block and fuel pump to engage beneath the push rod and hold it up. If the push rod falls during the pump installation procedure, and this sometimes occurs, the push rod driven by the cam shaft cannot engage and operate the fuel pump arm and therefore the pump will not operate, and the entire installation procedure must be repeated. Sometimes, heavy grease is utilized beneath the push rod to hold it up but if the engine is hot, this method frequently does not work successfully.

It is therefore the primary object of the present invention to eliminate the drawbacks and inconvenience of the prior art through provision of a very simplified device for engaging and holding the fuel pump push rod at the proper elevation while a fuel pump is being installed, and thus assuring proper operative engagement of the push rod with the fuel pump arm when the pump installation is completed.

It is a further object of the invention to take advantage of the location of an existing bolt hole in the engine block which is in alignment with the fuel pump push rod during a fuel pump replacement operation.

SUMMARY

In a V-8 engine of the type in which the fuel pump is mounted on the side of the engine block near the front of the engine, there is provided a threaded bore which extends into the block and intersects a passage containing a cam actuated push rod for driving the fuel pump. The threaded bore is normally closed by an ordinary threaded bolt. The present invention comprises a specially designed holding device which is threaded into the threaded bore upon removal of the bolt to engage the push rod and hold it in place when it becomes necessary to remove the fuel pump for repair or replacement. The holding device according to a preferred embodiment comprises an elongated threaded member of relatively soft metallic material compared to that of the block, such as aluminum, and having safety means for preventing damage to the push rod comprising an undersized forward inner thread portion which will strip more readily than the threads of the engine block in the bore when overtightened. In a second embodiment the safety means comprises a relatively soft metallic inner end or tip on the holding device. After the fuel pump is replaced the holding device is removed to free the push rod and the common bolt is again reinserted in the threaded bore.

BRIEF DESCRIPTION OT THE DRAWINGS

FIG. 6 is a partial cross section of the engine block shown in FIG. 1 taken along the lines 6—6 with the preferred embodiment of the invention shown in FIG. 4 positioned thereat.

FIG. 7 is an enlarged partal view of the cross section shown in FIG. 6 and being illustrative of the thread engagement thereat.

DETAILED DESCRIPTION

Figure 1:
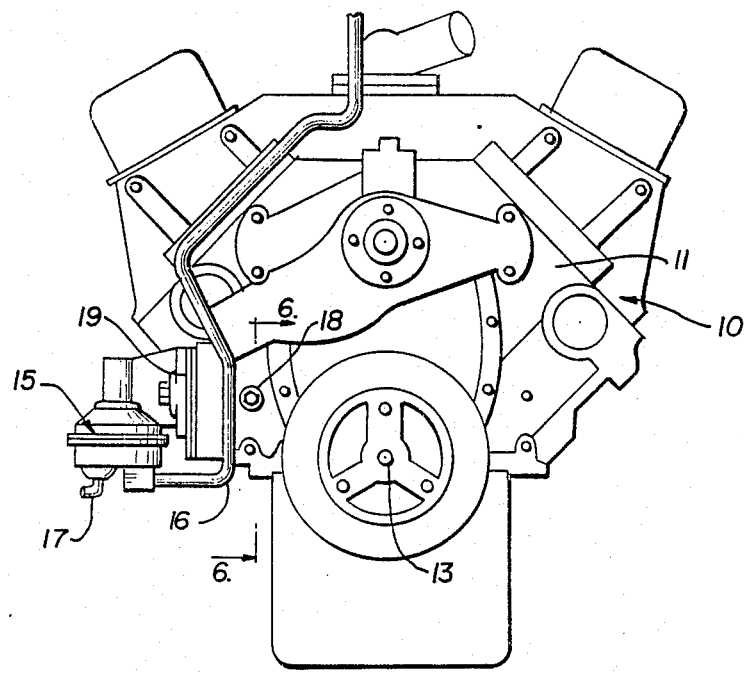
FIG. 1 is a front elevation of a General Motors V-8 gasoline engine of the type to which the present invention is applicable.
Figure 2:
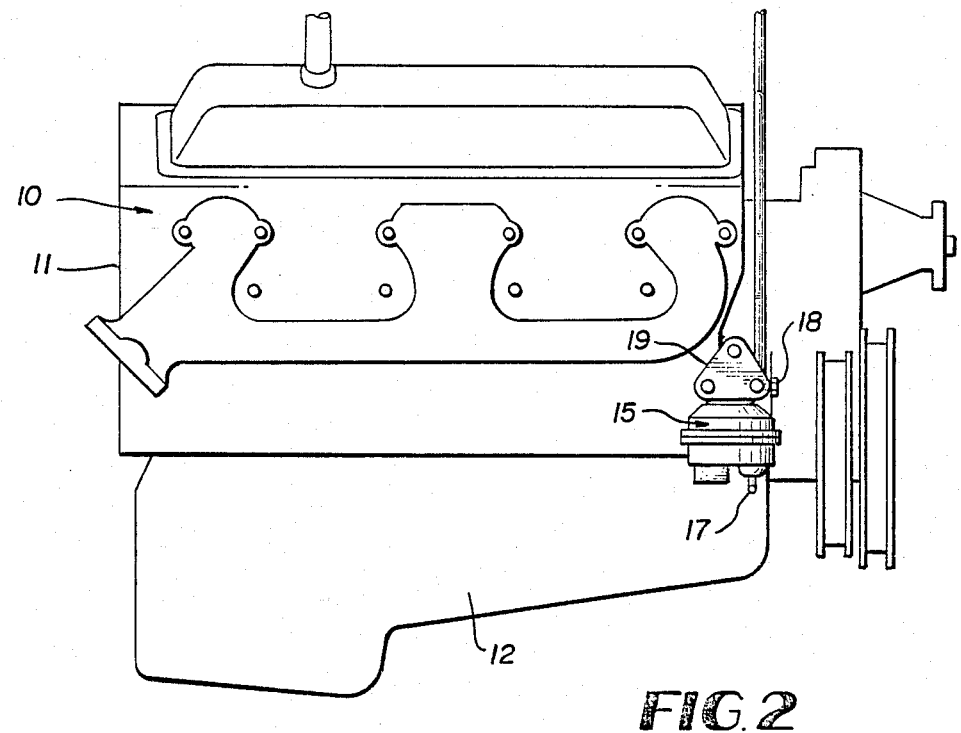
FIG. 2 is a side elevation of the engine shown in FIG. 1.

Referring to the drawings in detail wherein like numerals designate like parts, a typical General Motors V-8 gasoline engine 10 is illustrated in the drawings having a block 11, an oil pan 12, a crank shaft 13 and cam shaft 14. V-8 engines of this type have been manufactured on a production basis from 1955 to the present date.

In the regular maintenance of the engines, it may become necessary to remove the fuel pump 15 and replace it with a new or rebuilt pump. In doing this, the mechanic will normally remove the engine air filter and disconnect the fuel line 16 at the carburetor and then disconnect the fuel line at the pump 15. The fuel inlet line 17 is also disconnected at the fuel pump and suitably plugged. Some engines have a return fuel line to the fuel tank, in which case this line is also disconnected and plugged prior to removing the fuel pump 15 and installing a new fuel pump.

Figure 3:
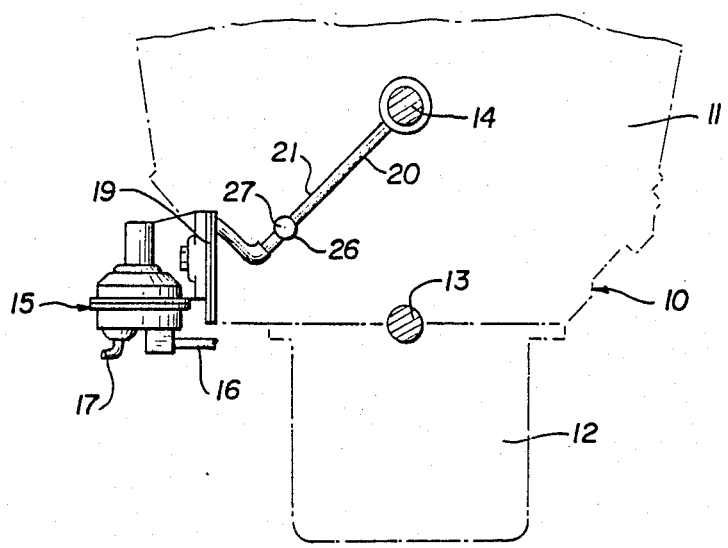
FIG. 3 is a vertical section taken through the engine, partly in elevation, showing the operative relationship of the fuel pump push rod and fuel pump arm.

An existing bolt 18 as shown in FIG. 1 is normally engaged in a threaded bore of the engine block 11 approximately two inches laterally inwardly to the right of the fuel pump mounting face 19. The threaded bore is further shown in FIG. 6 and is identified by reference numeral 18'. This bolt 18 is a ⅜th inch bolt having a length of ⅝ inch. The bolt 18 conveniently is in alignment with the fuel pump push rod 20 which is operatively connected to the engine cam shaft, as shown in FIG. 3, through the passage 21. When the fuel pump 15 is installed, its fuel pump arm 22 must be engaged by the push rod 20 in the manner shown in FIG. 3 if the fuel pump is to operate. If the push rod 20 is allowed to fall during the pump installation procedure, it cannot thereafter engage the fuel pump arm 22 and therefore the fuel pump will not operate. This problem has given rise to the haphazard and sometimes unsuccessful prior art schemes of holding up the arm with a screwdriver or some homemade implement by inserting the implement between the engine block and fuel pump while the pump is being installed and withdrawing the implement after the pump arm 22 has engaged the push rod 20. These procedures do not always work satisfactorily, in which case the pump has to be reinstalled. Considerable time and expense can be involved plus a lot of inconvenience on the part of the mechanic.

Further as shown in FIG. 6, the distance D from the front face 23 of the engine block 11 to the front surface 24 of the push rod 20 within the passage 21 is one inch. This is the distance as measured axially through the bore 18' and which is also provided with internal threads 25 which comprise ⅜ in. USS threads.

Figure 4:
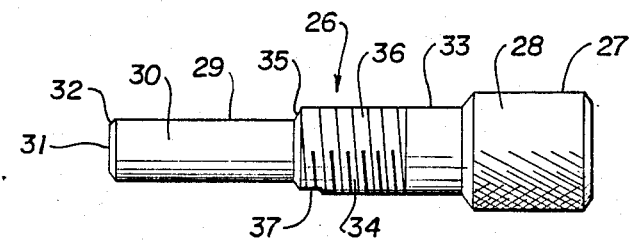
FIG. 4 is a side elevational view of a push rod holding device comprising the preferred embodiment of the invention.
Figure 5:
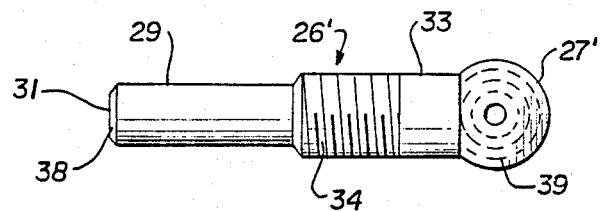
FIG. 5 is a side elevational view of a second embodiment of the invention.

This now leads to the consideration of the subject invention, two embodiments of which are shown in FIGS. 4 and 5.

Referring now to FIG. 4, the holding device shown thereat comprises an elongated member 26 which is formed of a material, preferably metal, a typical example being aluminum, which is softer than the cast iron of the engine block 11 and the threads 25 of the axial bore 18'. The outer end 27 of the elongated member 26 is preferably of cylindrical shape with a knurled outer surface 28 and being of approximately ½ in. diameter and ½ in. in length. The cylindrical shape of the outer end 27, in addition to being economical to produce, is preferable to a square or hexagonal shape in order to encourage tightening by hand rather than with a wrench. The inner end 29 of the holding device 26 includes a smaller cylindrical portion or projection 30 which terminates in a flat smooth push rod engaging end 31. Since the threaded bore 18' in the block 11 is ⅜ in. nominal, the cylindrical portion 30 is of a smaller diameter than the internal diameter of the internal threads 25 of the bore 18' (FIG. 6). Preferably the outside diameter of the cylindrical portion 30 is ¼ in. The end surface 31 is separated from the cylindrical surface of portion 30 by way of a tapered surface 32 to avoid any sharp edges. An intermediate body portion 33 including an unthreaded surface is located adjacent the knurled outer end 27. Inwardly of the intermediate body portion 33 is located a threaded body portion 34 which terminates in a tapered shoulder 35.

In the preferred embodiment of FIG. 4, the length of the inner cylindrical projection 29 is $\mu$ in. and the length of the tapered portion 35 separating the cylindrical portion 29 and the threaded portion 34 is 1/16 in. In the intermediate portion of the device 26, the threaded portion 34 and the unthreaded cylindrical portion 33 are of approximately ⅜ in. and 5/16 in., respectively.

As previously indicated, the distance D from the front face 23 of the engine block 11 to the push rod 20 in the passage 21 is one inch. The threaded portion 34 permits the holding device 26 to be threaded into the bore 18' a distance to bring the forward tip 31 against the push rod 20; however, only 2½ to 3 threads (3/16 in.) of the threaded portion 34 are threaded into the internal threads 25 of the bore 18'. In the preferred embodiment, for a bore 18' including ⅜ USS threading, the threaded portion 34 of the holding device 26 is comprised of undersized ⅜ USS threading, preferably by 0.004 in. in outside diameter; however, the first 2½ to 3 threads 37 are purposely made of an even greater undersize, for example, 0.008 in. in outside diameter as illustrated in FIG. 7 and being located approximately one inch behind the tip 31. This provides a means for preventing the holding device 26 from being tightened to the extent that damage is caused to the push rod 20 when the device is utilized in a fuel pump changing operation.

Accordingly when it becomes necessary to replace a fuel pump 15, the ⅜ in. bolt 18 is removed from the threaded bore 18' and the holding device 26 is threaded by hand into the bore 18' and it is tightened only sufficiently tight to hold the push rod 20 against the opposite side of the passage 21 as shown in FIG. 6. If one attempts to unduly tighten the holding device 26, for example by turning it with pliers, the fact that it is made of a relatively soft material and the threads which have entered the bore 18' are undersized, the tips of the threads, particularly those of threads 37, will strip away before sufficient pressure is applied to damage the push rod 20 or strip the internal threads 25 of the bore 18'. Once the holding device 26 is in place, the defective fuel pump can be removed and a new one installed without the fear of having the push rod slip out of position.

The second embodiment of the invention is shown in FIG. 5. The holding device 26' shown thereat comprises a device which may be formed, when desired, of harder metal. The distinguishing feature from that of the embodiment shown in FIG. 4 is that it includes a threaded portion 34 which is of a uniform thread size, being of a normal ⅜ USS thread or an undersized ⅜ USS thread; more importantly, however, the inner end 31 includes a tip which may be in the form of an insert comprised of soft metal 38, for example brass, which acts as means to avoid damage to the push rod 20 by overtightening of the holding device 26'. While the outer end of the holding device can be of the cylindrical knurled type shown in FIG. 4, the embodiment in FIG. 5 shows it being comprised of a circular flat portion 39 such as found in a key or wing nut.

It can be seen that the present invention provides a simplified convenient and a highly reliable precision device for installing a V-8 engine fuel pump with a certain knowledge that the fuel pump push rod 20 will properly engage the fuel pump arm of a newly installed fuel pump. The makeshift arrangements and inconvenience of the prior art are entirely limited and no structural alteration of the engine or fuel pump is required.

It should be noted that the foregoing detailed description of the invention has been made by way of illustration and not limitation. Accordingly, all modifications, alterations and changes coming within the spirit and scope of the invention as defined by the accompanying claims are meant to be included.

I claim:

1. In combination, a fuel pump on an internal combustion engine of the type including an engine block, a rotatable cam extending longitudinally of said block, said fuel pump being located externally of said block at the fuel pump location on one side of said block adjacent the front end thereof, said block having at said fuel pump location an external mounting face, and a passage extending from said cam toward said mounting face, a threaded bore extending into said block from said front end thereof and perpendicularly intersecting said passage, said fuel pump further having an inner mounting surface for engagement against said mounting face of of said block and having an actuator extending into said passage, a push rod in said passage and having an inner end engaging said cam so as to be reciprocated thereby on rotation of said cam and including an outer end in engagement with said actuator of said fuel pump, said threaded bore being aligned with a side surface of said push rod in said passage, said side surface of said push rod being at a substantially fixed predetermined distance from the front of said block at the outer end of said threaded bore, and a holding tool insertable into said threaded bore for temporarily holding the push rod while removing and replacing the fuel pump, said holding tool comprising:

an elongated member formed of solid material and having a length greater than said threaded bore, said member including an inner push rod engaging end, an outer end for manual manipulation and an intermediate threaded portion for theaded engagement with said threaded bore during a fuel pump changing operation, said member further including means for preventing damage to the push rod when said member is threaded into said bore.

2. The tool as defined by claim 1 wherein said member is comprised of a metal which is relatively soft in comparison to the composition of said block.

3. The tool as defined by claim 2 and wherein said means for preventing damage to the push rod comprises the initial portion, at least, of said intermediate threaded portion adjacent said inner end and wherein said initial portion includes undersized threading relative to the threading of said bore.

4. The tool as defined by claim 3 wherein said threading of said bore comprises ⅜ USS threading and said initial portion of said intermediate threading comprises ⅜ USS threading undersized substantially 0.008 in. in outside diameter.

5. The tool as defined by claim 4 wherein the remaining threading of said intermediate threaded portion comprises ⅜ USS threading undersized substantially 0.004 in. in outside diameter.

6. The tool as defined by claim 3 wherein said elongated member additionally includes an elongated cylindrical body portion extending coaxially forward from said threaded intermediate portion and terminating at said inner end, said cylindrical body portion being of a smaller diameter than the inner diameter of said intermediate threaded portion and joined thereto by a tapered shoulder.

7. The tool as defined by claim 6 wherein said elongated member is formed of aluminum.

8. The tool as defined by claim 7 wherein the distance between said inner end to said initial portion of said intermediate threaded portion comprises the distance from said front end of the block to the side surface of said push rod.

9. The tool as defined by claim 1 wherein said means for preventing damage to the push rod comprises a region of relatively soft metal located on an inner push rod engaging end.

10. The tool as defined by claim 1 wherein said elongated member is formed of metal and wherein said means for preventing damage to the push rod comprises a brass insert formed at the tip of said push rod engaging end.

* * * * *